US010506889B2

(12) United States Patent (10) Patent No.: US 10,506,889 B2
Wilkinson et al. (45) Date of Patent: Dec. 17, 2019

(54) INSULATED VESSEL WITH AUGMENTED REALITY TARGET AND SYSTEM UTILIZING THE SAME

(71) Applicant: Tervis Tumbler Company, North Venice, FL (US)

(72) Inventors: Brock Wilkinson, North Port, FL (US); Daniel Childs, Nokomis, FL (US)

(73) Assignee: Tervis Tumbler Company, North Venice, FL (US)

( * ) Notice: Subject to any disclaimer, the term of this patent is extended or adjusted under 35 U.S.C. 154(b) by 37 days.

(21) Appl. No.: 15/878,832

(22) Filed: Jan. 24, 2018

(65) Prior Publication Data

US 2018/0255947 A1 Sep. 13, 2018

Related U.S. Application Data

(60) Provisional application No. 62/468,441, filed on Mar. 8, 2017.

(51) Int. Cl.
*A47G 19/22* (2006.01)
*G06T 11/60* (2006.01)
*G06T 19/00* (2011.01)
*G06T 11/00* (2006.01)

(52) U.S. Cl.
CPC ..... *A47G 19/2227* (2013.01); *A47G 19/2288* (2013.01); *G06T 11/00* (2013.01); *G06T 11/60* (2013.01); *G06T 19/006* (2013.01)

(58) Field of Classification Search
CPC ............... B65D 1/265; B65D 21/0209; B65D 2203/10; B65D 25/205; B65D 85/70; G06T 19/006; G06T 11/60; G06K 7/10128; G06K 7/10366; A47G 19/2227; A47G 19/2288; A47G 43/0761
USPC ......................................................... 345/633
See application file for complete search history.

(56) References Cited

U.S. PATENT DOCUMENTS

| | | | |
|---|---|---|---|
| 2008/0036608 A1* | 2/2008 | Sakama | G06K 19/07749 340/572.7 |
| 2008/0272225 A1* | 11/2008 | Hein | A22C 11/125 242/602 |
| 2011/0114647 A1* | 5/2011 | Hallberg | A47G 19/2227 220/592.17 |
| 2014/0028712 A1 | 1/2014 | Keating et al. | |
| 2014/0028713 A1 | 1/2014 | Keating et al. | |
| 2014/0210947 A1* | 7/2014 | Finn | G01C 15/002 348/46 |
| 2015/0199572 A1 | 7/2015 | Kim et al. | |
| 2015/0334161 A1 | 11/2015 | Bullotta et al. | |
| 2016/0075479 A1* | 3/2016 | Finke | B65D 21/045 206/459.5 |

(Continued)

*Primary Examiner* — Jin Cheng Wang
(74) *Attorney, Agent, or Firm* — Caesar Rivise, PC

(57) ABSTRACT

Disclosed is a double walled vessel for use in an AR system. The AR system includes AR software and an AR display device having a camera and a video screen. The double walled vessel includes an inner vessel disposed within an outer vessel to form an isolated space between the inner and outer vessels. An AR target is located in the isolated space so that it is protected, but visible through the walls of the vessel. The AR display device is configured to take an image of the AR target by its camera, whereupon the AR system's software processes that image to produce an augmented reality image which is provided on the AR display device's screen for viewing by a user.

20 Claims, 4 Drawing Sheets

(56) References Cited

U.S. PATENT DOCUMENTS

| | | |
|---|---|---|
| 2016/0328883 A1 | 11/2016 | Parfenov et al. |
| 2017/0046546 A1* | 2/2017 | Gibson .............. G06Q 30/0269 |
| 2017/0092090 A1* | 3/2017 | Lerner ............... G06K 7/10366 |
| 2017/0246778 A1* | 8/2017 | Trowbridge ............ E21B 47/01 |
| 2018/0110939 A1* | 4/2018 | Lanzkowsky .......... A61K 9/007 |
| 2019/0117888 A1* | 4/2019 | Burkholz .......... A61M 5/16831 |

* cited by examiner

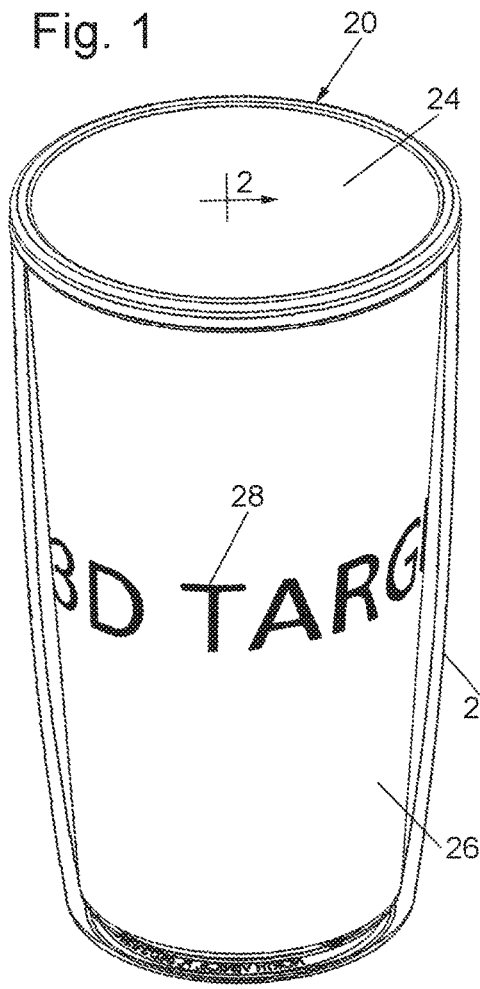
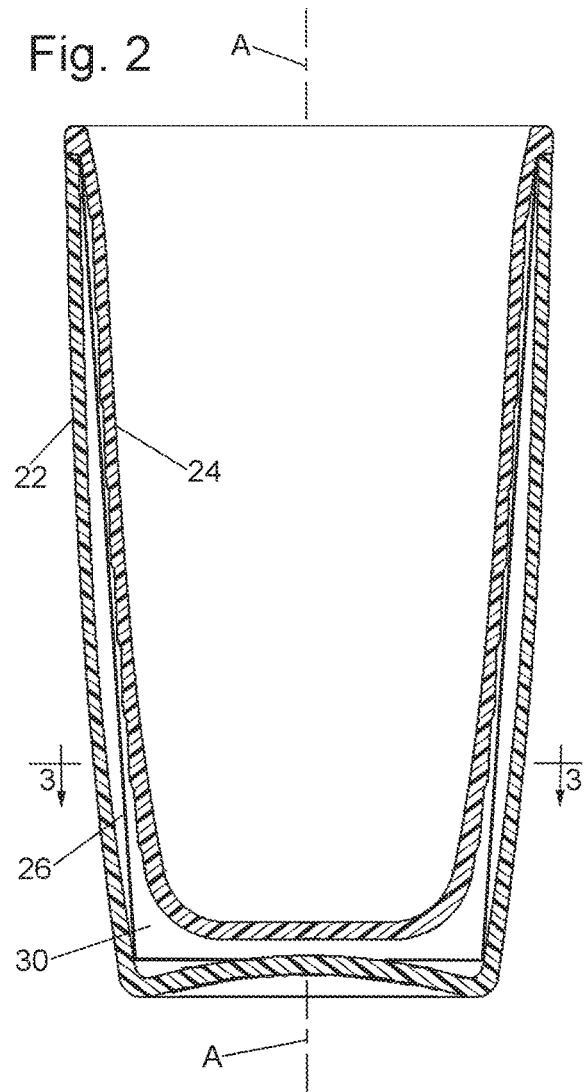
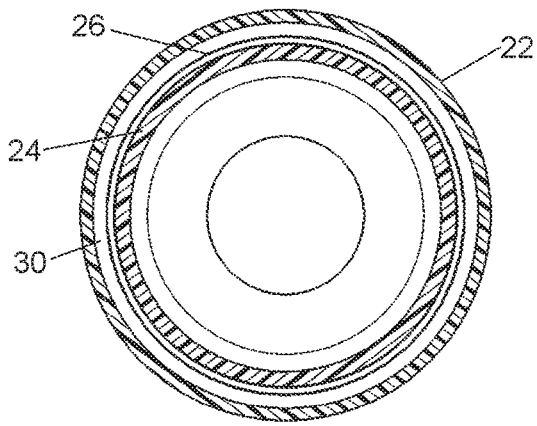

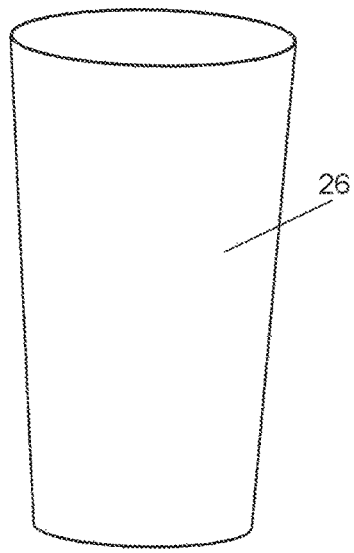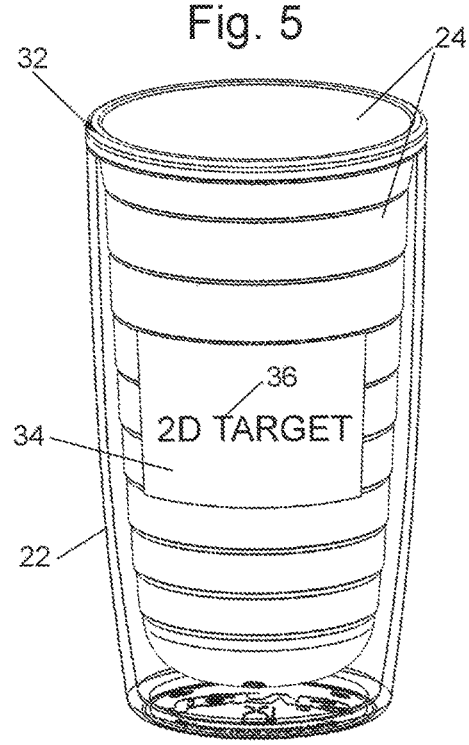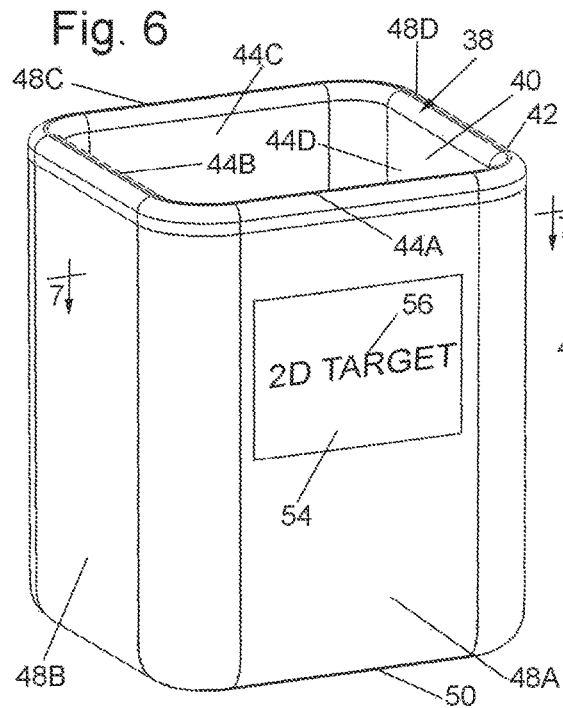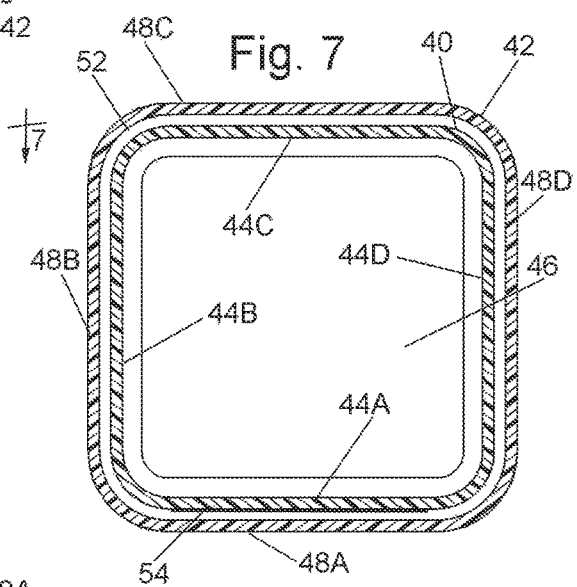

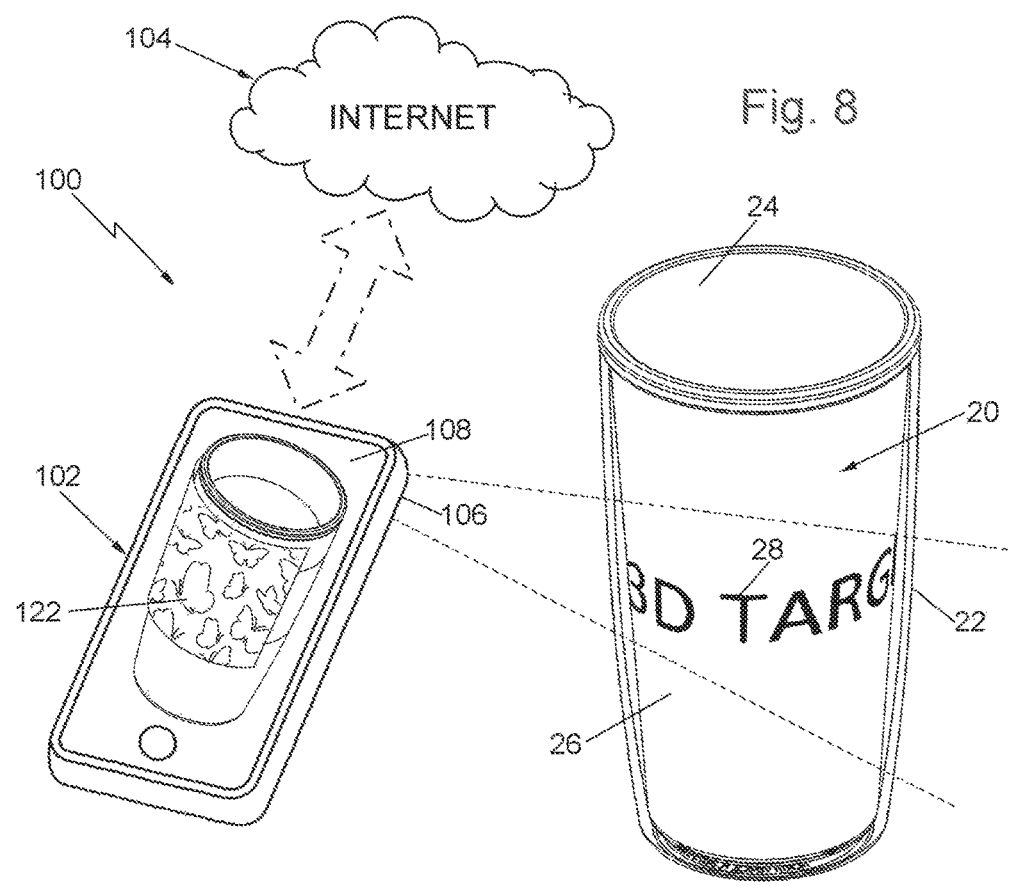
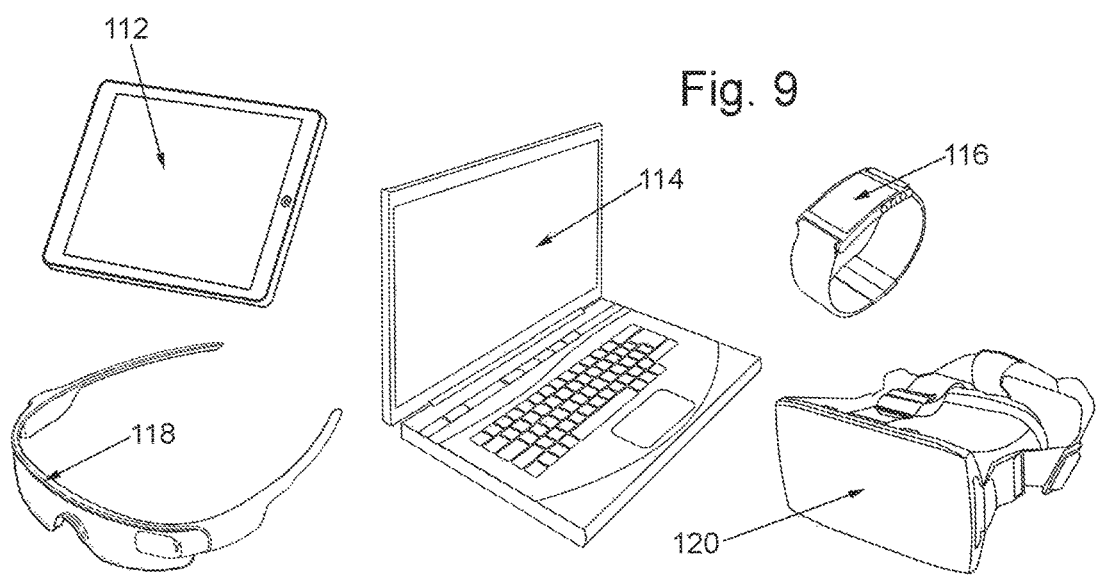

INSULATED VESSEL WITH AUGMENTED REALITY TARGET AND SYSTEM UTILIZING THE SAME

CROSS-REFERENCE TO RELATED APPLICATIONS

This utility application claims the benefit under 35 U.S.C. § 119(e) of Provisional Application Ser. No. 62/468,441 filed on Mar. 8, 2017, entitled Insulated Vessel with Augmented Reality Target and System Utilizing the Same. The entire disclosure of the provisional application is incorporated by reference herein.

FIELD OF THE INVENTION

This invention relates generally to double walled vessels, e.g., insulated drinking vessels, and more particularly to double walled vessels including augmented reality targets which when scanned provide an augmented reality display on an associated display device.

BACKGROUND OF THE INVENTION

As is known, augmented reality (AR) uses real world objects or targets and overlays them with virtual or augmented content. The AR target is loaded into an application that is used to track the position of the real world object with a camera. The AR software detects the position and orientation of the target and overlays a virtual image that appears to be in place of or attached to the target. AR is becoming more and more a part of daily life, particularly in commerce. For example, it is becoming popular to provide an AR target on a product so that when the target is scanned or imaged by the camera of a smartphone or some other device, an augmented reality image is superimposed over the target image or substituted for the targeted image on the smartphone/device. The superimposed augmented image may be static or video and may include audio. Many software development kits (SDKs) to produce the AR systems are commercially available from various developers. One such developer is PTC, Inc., of Needham, Mass., provides software to enable AR applications under the registered trademark VUFORIA.

Some examples of AR systems are disclosed in U.S. Printed Patent Application Nos: 2016/0328883; 2015/0334161; 2015/0199572; 2014/0028713; and 2014/0028712.

A key measure of AR systems is how realistically they integrate augmentations with the real world. The software must derive real world coordinates, independent from the camera, from camera images. That process is called image registration and uses different methods of computer vision to assess the AR target. To that end, a typical AR target includes a large plurality of interest or tracking points, which when scanned by an AR enabled device using image recognition and registration, result in the production of the AR image. Because the AR target includes a large number of interest or tracking points which must be compared to stored data in order to generate the AR image, if the AR target becomes damaged or degraded the AR system may not produce the desired AR image. That constitutes a problem inasmuch as AR targets typically provided on products are usually printed on a surface of the product and hence are exposed to damage upon handling. Thus, a need exists for a system ensuring that an AR target on a product be protected from degradation/damage.

The subject invention achieves that end by providing an isolated compartment in which an AR target is disposed to protect it from the ambient surroundings. Moreover, that isolated compartment is itself in the form of the space between a double walled, e.g., insulated, vessel, such as a tumbler.

SUMMARY OF THE INVENTION

One aspect of this invention is a double walled vessel for use with an AR display device. The AR display device includes a video screen for providing an augmented reality image thereon and a camera for scanning an augmented reality target. The double walled vessel comprises an inner vessel, an outer vessel and an AR target. The inner vessel has a sidewall including an outer surface. The outer vessel has a sidewall including an inner surface. The inner vessel is disposed within the outer vessel with the outer surface of the inner vessel spaced from the inner surface of the outer vessel to form a hollow isolated space therebetween. The AR target is located in the isolated space, wherein the AR target is isolated from the ambient atmosphere outside of the double walled vessel. The AR target is configured to be visible through at least one of the sidewall of the outer vessel and the sidewall of the inner vessel, whereupon the AR target can be imaged or scanned by the camera of the augmented reality display device to cause the video screen to provide an augmented reality image thereon.

In accordance with one preferred aspect of the double walled vessel invention the AR target is a two dimensional target.

In accordance with another preferred aspect of the double walled vessel invention the AR target is a three dimensional target.

In accordance with another preferred aspect of the double walled vessel invention the double walled vessel is a drinking vessel, wherein the sidewall of the inner vessel is a circular sidewall surrounding a central longitudinal axis, wherein the sidewall of the outer vessel is a circular sidewall surrounding the central longitudinal axis, and wherein the hollow isolated space is annular.

In accordance with another preferred aspect of the double walled vessel invention the three dimensional target comprises a cylindrical or conical shaped sleeve.

In accordance with another preferred aspect of the double walled vessel invention, the double walled vessel is of a generally cuboid shape, wherein the sidewall of the inner vessel includes at least one portion that is generally planar, wherein the sidewall of the outer vessel includes at least one portion that is generally planar and wherein the hollow isolated space is located between the at least one portion of the sidewall of the inner vessel and the at least one portion of the sidewall of the outer vessel.

Another aspect of this invention is an AR system comprising an AR display device, and a double walled vessel. The AR display device comprises a video screen and a camera. The camera is configured to scan an AR target which results in the production of an augmented reality image on the video screen. The double walled vessel comprises an inner vessel, and outer vessel and an augmented reality target. The inner vessel has a sidewall including an outer surface. The outer vessel has a sidewall including an inner surface. The inner vessel is disposed within the outer vessel with the outer surface of the inner vessel spaced from the inner surface of the outer vessel to form a hollow isolated space therebetween. The AR target is located in the isolated space so that it is isolated from the ambient atmosphere outside of the double walled vessel. The AR target is configured to be visible through at least one of the sidewall of the outer vessel and the sidewall of the inner vessel, whereupon the AR target can be imaged or scanned by the camera of the AR display device to cause the video screen to provide an augmented reality image thereon.

In accordance with one preferred aspect of the AR system the augmented reality image overlays an image of the AR target with augmented content.

In accordance with another preferred aspect of the AR system the augmented content comprises a still image or a video image and wherein the still image or the video image may be accompanied by audio.

In accordance with another preferred aspect of the AR system the augmented reality display device is selected from the group consisting of smartphones, tablets, computers, goggles, glasses, head-sets, and other wearables.

BRIEF DESCRIPTION OF THE DRAWING FIGURES

FIG. 1 is an isometric view of one exemplary double walled vessel, e.g., a drinking tumbler, having an inner vessel located within an outer vessel, and with a three-dimensional (3D) target located between the inner and outer vessels;

FIG. 2 is a longitudinal sectional view taken along line 2-2 of FIG. 1;

FIG. 3 is a transverse sectional view taken along line 3-3 of FIG. 2;

FIG. 4 is a reduced isometric view of the conical insert on which the 3D target is printed;

FIG. 5 is an isometric view of another exemplary double walled vessel, e.g., a drinking tumbler, having an inner vessel located within an outer vessel, and with a two-dimensional (2D) target located between the inner and outer vessels;

FIG. 6 is an isometric view of another exemplary double walled vessel, e.g., a rectangular box having an inner vessel located within an outer vessel, in which a 2D target is located between the inner and outer vessels;

FIG. 7 is a transverse sectional view taken along line 7-7 of FIG. 6;

Figure 10:
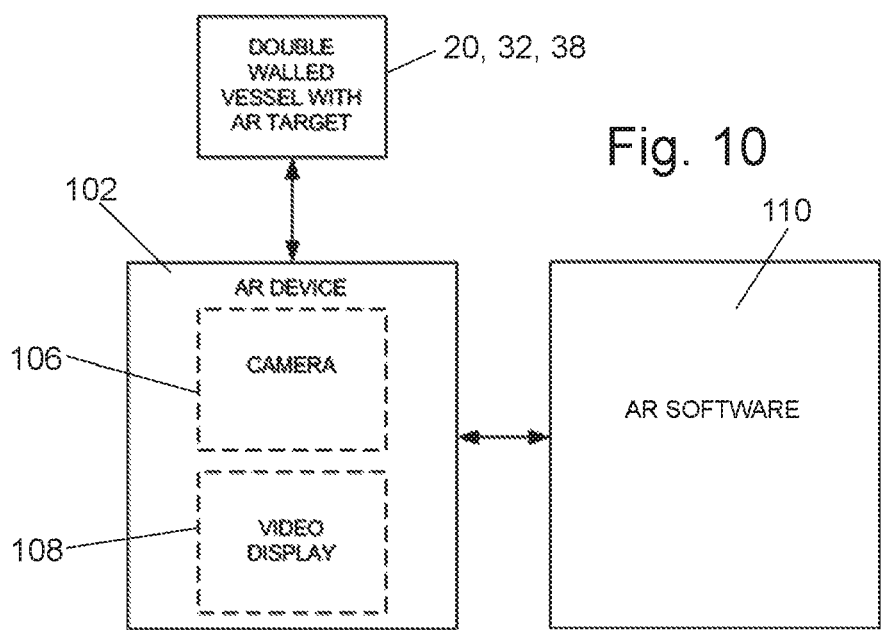

FIG. 8 is an illustration of one exemplary AR system using one exemplary AR device, i.e., a smartphone, to scan the 3D target of the double walled vessel of FIG. 1, wherein the signal from a camera in the smartphone representing the scanned image of the AR target is transmitted wirelessly or otherwise to the Internet for processing, whereupon the processed image from the Internet is downloaded back to the smartphone to provide the augmented image on the smartphone's display;

FIG. 9 is an illustration of various other AR devices that can be used in lieu of the smartphone of FIG. 8;

FIG. 10 is a is block diagram of a basic AR system of this invention; and

Figure 11:
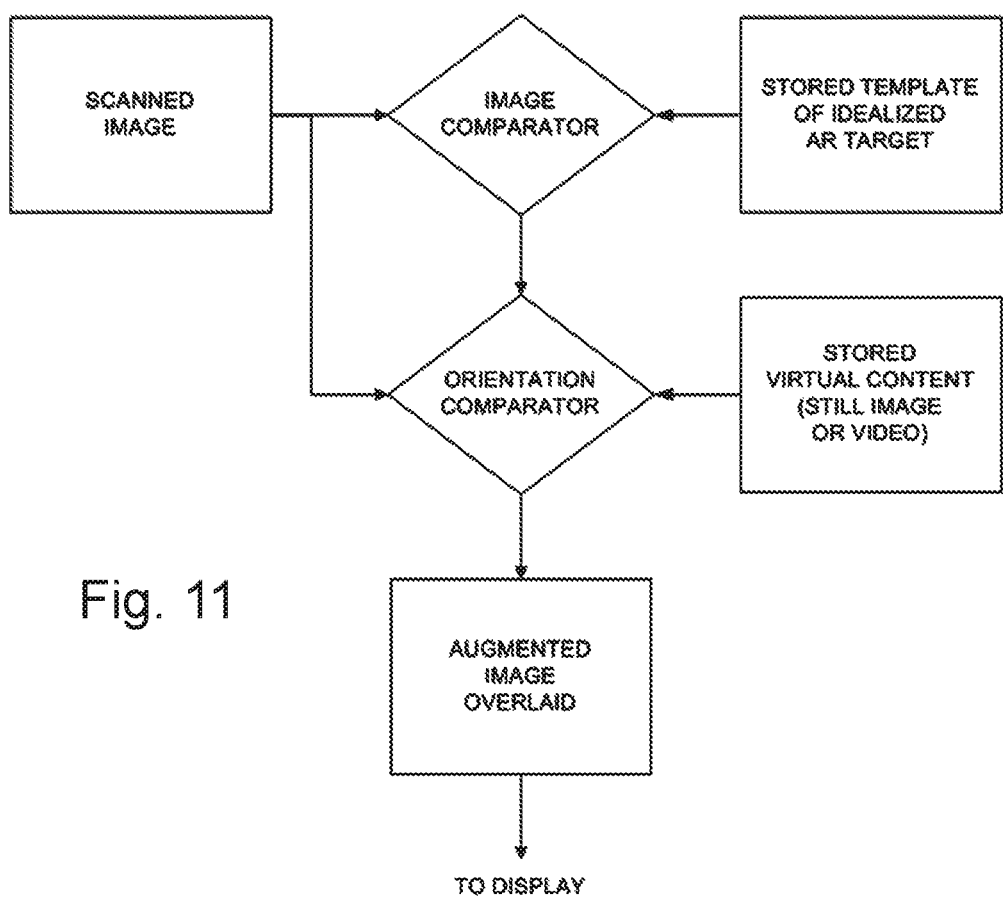

FIG. 11 is a process diagram showing the operation of the software of the system shown in FIG. 10.

DETAILED DESCRIPTION OF THE PREFERRED EMBODIMENTS

Referring now to the drawings wherein like reference characters refer to like parts there is shown in FIG. 1 one exemplary embodiment of a double walled vessel 20 constructed in accordance with this invention. The vessel 20 is an insulated drinking vessel, e.g., a tumbler. However, it must be pointed out at this juncture that the tumbler 20 is merely illustrative of numerous double walled vessels that can be constructed in accordance with this invention. The tumbler 20 basically comprises an assembly of a hollow outer body or vessel 22, a hollow inner body or vessel 24, and a decorative wrap 26. The decorative wrap 26 includes an AR target 28 which is configured to be scanned by an AR display device or unit 102 of an AR system 100, all of which will be described later. Suffice it for now to state that the AR display device 102 may be any type of device having a screen or some other display device for providing an augmented reality image for viewing by a user. Examples, of such AR display devices are smartphones, tablets, computers, goggles, glasses, head-sets, smart watches and other wearables, such as shown in FIG. 9.

As best seen in FIG. 2, the outer vessel 22 is a hollow member having a sidewall which is a body of revolution extending about a central longitudinal axis A. The outer vessel can be formed in any manner, e.g., it can be blow molded or injection molded of any suitable plastic material. The hollow inner vessel 24 is also a hollow member having a sidewall which is a body of revolution extending about the central longitudinal axis A. The outer vessel can also be formed in any manner, e.g., it can be blow molded or injection molded of any suitable plastic material (e.g., the same plastic material as the vessel 22 or some other material). Each vessel includes an inner surface and an outer surface. The inner vessel 24 is located within the outer vessel so that its outer surface is disposed opposite and confronting the inner surface of the outer vessel, but is spaced slightly therefrom to form an isolated annular space 30 or compartment therebetween.

As is conventional the inner vessel and outer vessel are secured together by a welded, e.g., ultrasonically welded, joint (not shown) at their top portions to isolate the annular space 30 from the ambient atmosphere. The space 30 can be filled with air or some other gas to render it insulating. With the foregoing arrangement the inner vessel 24 of the tumbler 20 is thermally insulated from the ambient atmosphere surrounding the outer vessel. Thus, any type of liquid, e.g., cold water or soda, hot tea or coffee, etc., can be held within the inner vessel to maintain its temperature.

The decorative wrap 26 will be described shortly. Suffice it for now to state that it is designed to be disposed within the annular space 30 of the tumbler to provide an aesthetically pleasing appearance for the tumbler. To that end, as is conventional, the sidewall of the outer vessel 22 is transparent or translucent or includes a portion or window which is transparent or translucent so that the decorative wrap is visible through it. In accordance with one exemplary and preferred embodiment of this invention the inner and outer vessels are both formed of a transparent material. Any suitable transparent plastic material can be used. For example, Eastman Tritan™ copolyester sold by Eastman Chemical Company is one particularly desirable transparent material.

The wrap 26 is formed of a thin flexible material, e.g., polyester film, which is curled or rolled up into a generally conical shape, like shown in FIG. 4, so that it can be inserted into the annular space 30 and thus be visible through the sidewall of the outer vessel 22. Depending upon the shape of the annular space 30, the wrap may be rolled upon into a generally cylindrical shape, in lieu of the generally conical shape shown in FIGS. 2 and 4. In any case, the wrap 26 is "decorative" in that it includes any type of decoration on it. For example, the decoration may be in the form of any type of graphics printed or otherwise applied on the wrap so that the graphics are visible from the outer surface of the wrap. Such graphics need not be printed on the outer surface of the wrap, but could be printed on the inner surface of the wrap if the wrap is formed of a transparent or translucent material to enable the graphics to be visible through the wrap. Further still, if desired, the wrap may include decoration which is visible through the sidewall of the inner vessel, so that it can be seen when looking into the interior of the inner vessel. However, unlike conventional decorated wraps for decorating double walled vessels, the wrap 26 of this invention includes the heretofore identified AR target 28. If the target is to be viewed from outside the tumbler 20, the target may be printed on the outer surface of the wrap or may be printed on the inner surface of a wrap which itself is transparent or translucent so that the AR target can be seen through the wrap and through the outer vessel.

The AR target can be any target suitable for use in an AR system. In the example shown in FIG. 1, the AR target is a three-dimensional (3D) target, which takes up a major portion of the periphery of the wrap 26. In that exemplary embodiment the wrap 26, with its AR target 28, is disposed within the annular space 30 of the tumbler 20 such that the outer surface of the wrap faces the inner surface of the sidewall of the outer vessel 22. Thus, the AR target will be visible through the sidewall of the outer vessel 22 from various angles about the periphery of the tumbler. As such, the 3D target can be imaged (scanned) by the camera of the AR display device 102 from various directions and angles around the periphery of the tumbler to provide the desired augmented reality image on a display of the AR display device 102.

Since the wrap with the AR target 28 is enclosed within the isolated annular space 30 it is protected from being degraded or damaged by the ambient atmosphere or something making contact with it (as is the case of prior art AR targets on products). As will be appreciated by those skilled in the art it is important that the full image of the AR target remains intact because AR software uses a registration algorithm to detect the orientation of the target captured by the camera of the AR display device 102. By enclosing the AR target within the isolated space 28 it is protected from external damage, staining, or other degradation. Since the AR target is sealed in the interior space or compartment between the walls of a transparent or translucent double walled vessel, alternate decoration techniques could be utilized to create the AR target. Moreover, while the exemplary embodiment of FIG. 1 shows the AR target 28 visible through the outer vessel, the AR target may be configured so that it is visible through the sidewall of the inner vessel 24, if desired. Thus, one or both walls of the vessel could be transparent or translucent, depending on the type of AR target to be utilized.

Turning now to FIG. 5, there is shown another exemplary embodiment of a double walled vessel 32 constructed in accordance with this invention. That vessel is also a tumbler which is similar in construction to the tumbler 20, except for the component bearing the AR target. In the interest of brevity the common features of the tumblers 20 and 32 will be given the same reference numbers and the details of their construction and operation will not be reiterated. Thus, as can be seen in FIG. 5 the tumbler 32 is composed of an inner vessel 24 located within an outer vessel 22 to form an isolating annular space 30 between the sidewalls of those vessels. However, instead of a wrap 26 including an AR target being disposed within the insulated space, a slightly curved insert 34 is located within that insulated space. The insert 34 is a thin, label-like member which is fixedly secured in the space or compartment 30, e.g., it is fixedly secured to the outer surface of the sidewall of the inner vessel 24, although it could be fixedly secured to the inner surface of the sidewall of the outer vessel. The insert 34 includes a two dimensional (2D) target 36 printed thereon Like the tumbler 20, the inner and outer vessels of the tumbler 34 may be formed of a transparent or translucent material. If the AR target 36 is to be viewed from outside the tumbler 32, it may be printed on the outer surface of the insert 34 or may be printed on the inner surface of the insert, which itself is transparent or translucent, so that the AR target 36 can be seen through the insert and through the outer vessel. Alternatively, the AR target 36 may be configured so that it is visible through the sidewall of the inner vessel of the tumbler 32, if desired. In any case, since the insert 34 with the AR target 36 thereon is located within the isolated space 30 between the inner and outer vessels of the tumbler 32, it is protected from degradation or damage.

Turning now to FIGS. 6 and 7, there is shown another exemplary embodiment of a double walled vessel 38, e.g., an ice bucket, constructed in accordance with this invention. That vessel is of a cuboid or box-like shape and is composed of an inner vessel 40 located within an outer vessel 42. The inner vessel includes four generally planar sidewalls 44A, 44B, 44C and 44D, and a generally planar bottom wall 46. The outer vessel includes four generally planar sidewalls 48A, 48B, 48C and 48D, and a generally planar bottom wall 50. The sidewalls 44A, 44B, 44C and 44D are spaced apart from the sidewalls 48A, 48B, 48C and 48D, respectively, to form an isolated, insulated space 52 therebetween. A generally planar insert 54 is located within the space 52. The insert 54 includes an AR target 56 printed on it. If the AR target 56 is to be viewed from outside the cuboid vessel 38 it may be printed on the outer surface of the insert 54 or may be printed on the inner surface of the insert, which itself is transparent or translucent, so that the AR target can be seen through the insert and through the sidewall of the outer vessel. Alternatively, the AR target 56 may be configured so that it is visible through the sidewall of the inner vessel of the cuboid vessel 38, if desired.

In the exemplary embodiment shown in FIGS. 6 and 7, the AR target-bearing insert 54 is fixedly secured to the outer surface of the sidewall 44A of the inner vessel 40, although it could be fixedly secured to the inner surface of the sidewall 48A of the outer vessel 42. In fact, the insert 54 can be fixedly secured to any sidewall of either the inner or outer vessels. With the insert 54 secured to the outer surface of the sidewall 44A of the inner vessel 40, it is visible through the sidewall 48A of the outer vessel, so that it can be imaged or scanned by the camera of the AR display device 102 aimed at that sidewall. Moreover, being located within the isolated space 54 the AR target 56 is protected from degradation or damage.

In FIG. 8 there is shown one exemplary AR system 100 constructed in accordance with this invention. The system 100 basically comprises the double walled tumbler 20 (or any other double walled vessel contemplated by this invention) bearing an AR target, an AR display device 102, and the Internet 104. The AR display device 102 is in the form of a conventional smartphone having a camera 106, and a video display screen 108 and associated AR software 110, which preferably is in the form of an AR "app" resident in the device 102. Alternatively, the AR display device can be any one of numerous conventional devices including a built-in camera, a display screen and associated AR software. Some examples of such alternative devices are shown in FIG. 9. Those alternative devices are: a tablet 112, a computer 114, a smart watch 116, goggles 118, and a VR headset 120.

The AR software, e.g., the app on the smartphone, is configured so that when it is run or activated it causes the device's camera to take an image or scan of the AR target 28 when the camera 106 is aimed at the AR target. The AR software used may be any conventional software, like the heretofore identified VUFORIA® software. The digital signals representing the image of the AR target may then be processed internally in the app or may be uploaded to the Internet 104 for processing in the "cloud", whereupon the signals representing the augmented reality image 108 are downloaded back to the app for display on the smartphone's screen 106. Alternatively, all of the AR software and data for producing the augmented reality image may be resident in the app on the device. For example, the app in the AR display device may include the stored images/videos to be displayed thereon when the AR target is scanned by the device's camera. In that case, there would be no need to upload anything to the Internet. More likely, the AR software and/or the data establishing the AR images/videos can be distributed between the AR display device and the Internet as desired and depending upon the application.

FIG. 11 is a block diagram showing the basic operation of the AR system 100. In particular, the scanned image of the AR target as produced by the camera 106 is provided to an image comparator, where that image is compared to a stored template of an idealized AR target. That idealized AR target may be in the form of a database of stored templates representing what the AR target should look like. In addition the scanned image of the AR target as produced by the camera 106 is provided to an orientation comparator for comparison to stored virtual content, e.g., still images or videos. Assuming that the scanned AR target meets the criteria of the idealized AR target and is properly oriented with respect to the stored virtual content, that stored virtual content is overlaid on the scanned image and the signals representing augmented reality image are then sent to the video display screen 108 to produce the AR image for viewing by the user.

In the exemplary embodiment shown in FIG. 8, the augmented reality image 122 displayed constitutes a decorative wrap extending about the periphery of the tumbler 20, with the wrap bearing a still image of plural butterflies. As with most AR systems if the orientation of the smartphone is altered by the user the augmented reality image will reorient itself on the screen in accordance with the orientation of the smartphone to the AR target.

It should be pointed out at this juncture that the augmented reality image 108 instead of being a still image could be a video or any combination of still images and videos, with or without audio. Further still, the AR image displayed can be an interactive user interface (UI) which would enable the user to select a link to particular images/videos to be displayed upon the scanning of the AR target.

As should be appreciated by those skilled in the art double walled vessels constructed in accordance with this invention will not only provide their users with the basic function of holding hot or cold liquids, etc., but also with enhanced appeal as a result of the ability to provide an AR image upon the scanning of the AR target on the vessel. The subject invention can also serve as a marketing tool for a vendor or supplier of double walled vessels. For example, a generic double walled vessel, e.g., a tumbler, could be provided with an AR target, which when scanned by an AR display device would provide an AR image of a virtual vessel including any decorations or designs which are available for purchase. This would provide a marketing tool to enable consumers to evaluate different designs for possible purchase.

Without further elaboration the foregoing will so fully illustrate our invention that others may by applying current or future knowledge, adopt the same for use under various conditions of service.

We claim:

1. An augmented reality system comprising:
 a) a double walled vessel configured for use with an AR display device, the AR display device includes a video screen for providing an augmented reality image thereon and a camera or scanner for scanning an AR target, said double walled vessel comprising:
  1) an inner vessel having a sidewall including an outer surface;
  2) an outer vessel having sidewall including an inner surface, said inner vessel being disposed within said outer vessel with said outer surface of said inner vessel spaced from said inner surface of said outer vessel to form a hollow isolated space therebetween; and
  3) an AR target located in said isolated space, wherein said AR target in the form of a visible image and is located directly in front of a portion said sidewall of said inner vessel and directly behind a portion of said sidewall of said outer vessel whereupon said AR target is located between said portion of said sidewall of said inner vessel and said portion of said sidewall of said outer vessel, said AR target being isolated from the ambient atmosphere outside of said double walled vessel to protect said AR target from external damage, staining, or other degradation, said AR target being configured to be visible through at least one of said portion of said sidewall of said outer vessel and said portion of said sidewall of said inner vessel, whereupon said visible image of said AR target can be imaged or scanned by the camera or scanner of the AR display device to produce an electronic signal indicative thereof; and
 b) software configured to operate in response to the electronic signal from the camera or scanner to result in the production of an augmented reality image on the video screen.

2. The augmented reality system of claim 1 wherein said AR target is a two dimensional target.

3. The augmented reality system of claim 1 wherein said AR target is a three dimensional target.

4. The augmented reality system of claim 3 wherein said three dimensional target comprises a cylindrical or conical shaped sleeve.

5. The augmented reality system of claim 1, wherein said double walled vessel is a drinking vessel, wherein said sidewall of said inner vessel is a circular sidewall surrounding a central longitudinal axis, wherein said sidewall of said outer vessel is a circular sidewall surrounding said central longitudinal axis, and wherein said hollow isolated space is annular.

6. The augmented reality system of claim 1, wherein said double walled vessel is of a generally cuboid shape, wherein said sidewall of said inner vessel includes at least one portion that is generally planar, wherein said sidewall of said outer vessel includes at least one portion that is generally planar and wherein said hollow isolated space is located between said at least one portion of said sidewall of said inner vessel and said at least one portion of said sidewall of said outer vessel.

7. The augmented reality system of claim 6 wherein said sidewall of said inner vessel is transparent or translucent.

8. The augmented reality system of claim 1 wherein said sidewall of said outer vessel is transparent or translucent.

9. The augmented reality system of claim 1 wherein said sidewall of said inner vessel is transparent or translucent.

10. An augmented reality system comprising:
  a) a double walled vessel comprising:
    i) an inner vessel having a sidewall including an outer surface;
    ii) an outer vessel having sidewall including an inner surface, said inner vessel being disposed within said outer vessel with said outer surface of said inner vessel spaced from said inner surface of said outer vessel to form a hollow isolated space therebetween;
    iii) an AR target located in said isolated space, wherein said AR target in the form of a visible image and is located directly in front of a portion said sidewall of said inner vessel and directly behind a portion of said sidewall of said outer vessel whereupon said AR target is located between said portion of said sidewall of said inner vessel and said portion of said sidewall of said outer vessel, said AR target being isolated from the ambient atmosphere outside of said double walled vessel to protect said AR target from external damage, staining, or other degradation, said AR target being configured to be visible through at least one of said portion of said sidewall of said outer vessel and said portion of said sidewall of said inner vessel;
  b) an AR display device comprising a video screen and a scanner, said scanner being configured to scan said visible image of said AR target and provide an electronic signal representative thereof; and
  c) software configured to operate in conjunction with said scanner and said video screen to result in the production of an augmented reality image on said video screen in response to said electronic signal.

11. The augmented reality system of claim 10, wherein said augmented reality image overlays an image of said AR target with augmented content.

12. The augmented reality system of claim 11, wherein said augmented content comprises a still image or a video image and wherein said still image or said video image may be accompanied by audio.

13. The augmented reality system of claim 10, wherein said AR display device is selected from the group consisting of smartphones, tablets, computers, goggles, glasses, headsets, smart watches and other wearables.

14. The augmented reality system of claim 10, wherein said AR target is a two dimensional target.

15. The augmented reality system of claim 10, wherein said AR target is a three dimensional target.

16. The augmented reality system of claim 15, wherein said three dimensional target comprises a cylindrical or conical shaped sleeve.

17. The augmented reality system of claim 10, wherein said double walled vessel is a drinking vessel, wherein said sidewall of said inner vessel is a circular sidewall surrounding a central longitudinal axis, wherein said sidewall of said outer vessel is a circular sidewall surrounding said central longitudinal axis, and wherein said hollow isolated space is annular.

18. The augmented reality system of claim 10, wherein said double walled vessel is of a generally cuboid shape, wherein said sidewall of said inner vessel includes at least one portion that is generally planar, wherein said sidewall of said outer vessel includes at least one portion that is generally planar and wherein said hollow isolated space is located between said at least one portion of said sidewall of said inner vessel and said at least one portion of said sidewall of said outer vessel.

19. The augmented reality system of claim 10, wherein said sidewall of said outer vessel is transparent or translucent.

20. The augmented reality system of claim 10, wherein said sidewall of said inner vessel is transparent or translucent.

* * * * *